2,973,988
PIPE HANDLING TOOL

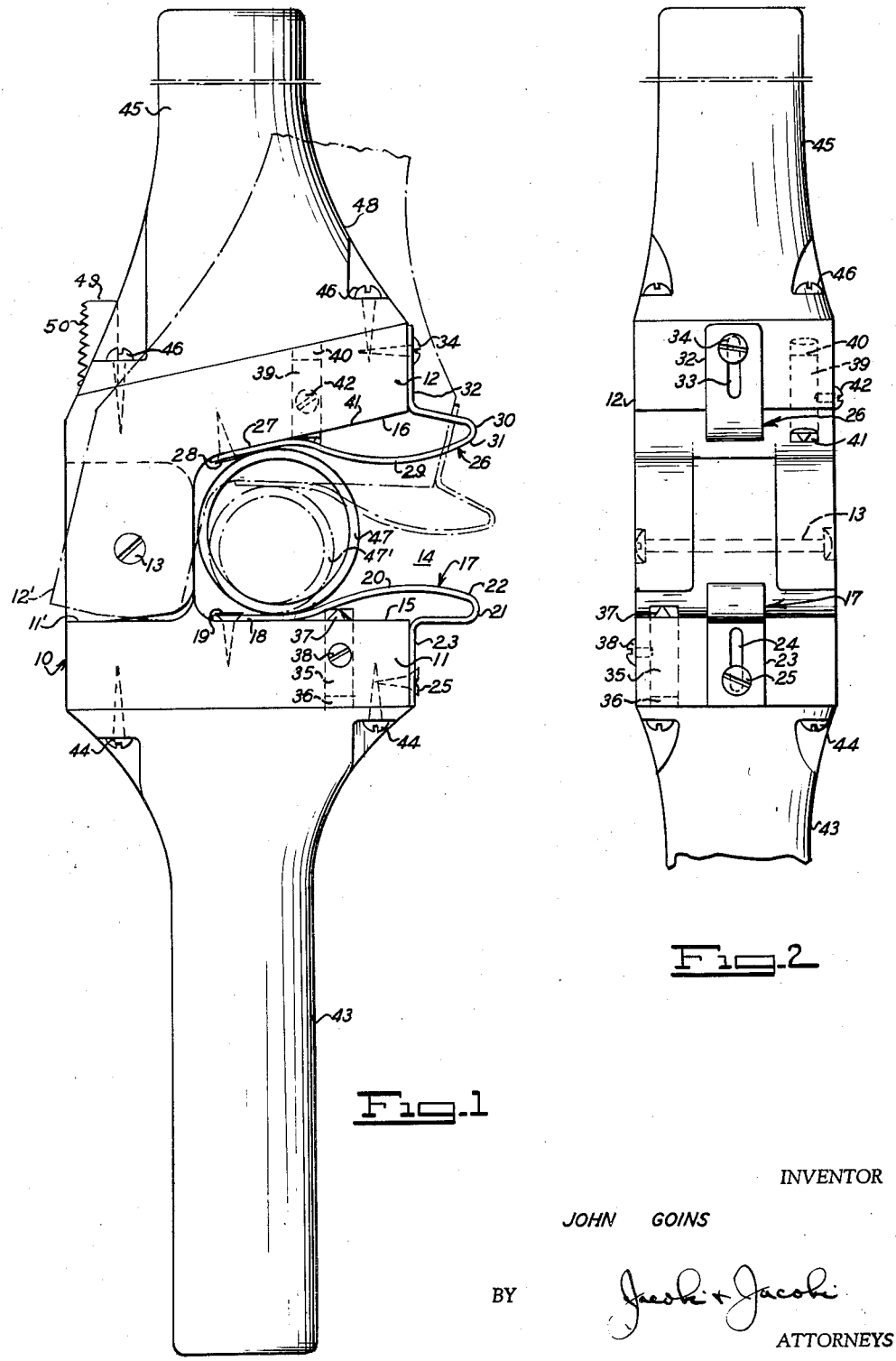

John Goins, Aztec, N. Mex.
(415 W. Park, Hobbs, N. Mex.)

Filed Aug. 7, 1959, Ser. No. 832,392

6 Claims. (Cl. 294—15)

This invention relates to article handling and more particularly to a tool for facilitating the manual handling and transportation of lengths of pipe.

As is well known lengths of pipe are frequently stored in stacks on the ground or in racks adjacent a location where such pipes are to be used and where these pipes of a size and weight to permit manual handling thereof each length of pipe is normally manually transported from the storage location to the place of use. Lengths of pipe are rather difficult to handle by merely grasping the same in the hands and consequently, it is proposed by this invention to provide a tool which will firmly engage a length of pipe and provide a means whereby such pipe may be lifted and transported by two or more persons grasping each tool applied to the pipe. Normally two tools constructed in accordance with this invention would be engaged with the pipe adjacent opposite ends thereof and two persons would grasp the oppositely projecting handles on each tool in order to lift the pipe and transport the same to the place of use.

It is accordingly an object of the invention to provide a pipe handling tool which may be conveniently engaged with a length of pipe to facilitate manual lifting and transportation of the same.

A further object of the invention is the provision of a pipe handling tool which may be utilized to engage pipe of a wide rang of diameters in order to facilitate handling of the same.

A still further object of the invention is the provision of a pipe handling tool for engagement with a length of pipe to facilitate manual handling of such pipe, the tool being provided with means for preventing inadvertent removal of the tool from the pipe.

Another object of the invention is the provision of a pipe handling tool for engagement with a length of pipe to facilitate manual handling of such pipe and in which the tool is provided with means for engagement with the pipe to prevent relative movement between the pipe and the tool.

A further object of the invention is the provision of a pipe handling tool which may be readily and economically constructed from readily available materials and which may be conveniently utilized without special instructions or any particular skill in order to facilitate the manual handling of lengths of pipe.

Further objects and advantages of the invention will be apparent from the following description taken in conjunction with the accompanying drawing wherein:

Fig. 1 is a side elevational view of a pipe handling tool constructed in accordance with this invention; and Fig. 2 a fragmentary bottom plan view of the tool shown in Fig. 1.

With continued reference to the drawing, there is shown a pipe handling tool constructed in accordance with this invention and which may well comprise a pipe engaging head 10, such head including jaws 11 and 12 hingedly connected together at one side by a hinge pin 13. As clearly shown in Fig. 1, the jaws 11 and 12 are so formed and connected together as to provide a laterally opening recess 14 defined by the opposed confronting jaw faces 15 and 16 on the jaws 11 and 12 respectively. As clearly shown in Fig. 1 the recess 14 is open at the sides and top of the tool, but is closed at the bottom by the elements forming the hinge connection between the jaws 11 and 13.

The leaf spring 17 is secured at one end 18 by screw threaded fastening means or the like 19 to the jaw 11 and the mid-portion 20 of the spring 17 extends outwardly along the adjacent jaw face 15 and in spaced relation thereto and at the outer end, the spring 17 is provided with a return bend 21 to provide a pipe engaging camming surface 22, the purpose and operating of which will be later described. The spring 17 terminates at the outer end in an angularly disposed portion 23 having a slot 24 therein and screw threaded or other suitable fastening means 25 extends through the slot 24 into the jaw 11. The slot 24 permits movement of the spring 17 toward or away from the jaw face 15 of the jaw 11.

In a similar manner, a leaf spring 26 is secured at one end 27 by screw threaded fastening means or the like 28 to the jaw 12 and the mid-portion 29 of the spring 26 extends outwardly along the jaw face 16 of the jaw 12 in spaced relation thereto. The outer end of the spring 26 is provided with a return bend 30 which provides a camming portion 31, the purpose of which will be presently described. The spring 26 terminates at the outer end in an angularly disposed portion 32 having a slot 33 therein and projecting through the slot 33 and into the jaw 12 is a screw threaded fastening means or the like 34. The slot 33 and fastening means 34 permits movement of the spring 26 toward or away from the jaw face 16 of the jaw 12.

A toothed key 35 is removably received in a bore 36 in the jaw 11 and the outer toothed end 37 of the key 35 projects inwardly of the jaw face 15 of the jaw 11 for a purpose to be later described. The key 35 may be removably retained in the bore 36 in adjusted position by screw threaded fastening means or the like 38.

A similar toothed key 39 is removably received in a bore 40 in the jaw 12 and the outer toothed end 41 of the key 39 projects outwardly of the jaw face 16 of the jaw 12. The key 39 is removably secured in adjusted position in the bore 40 by screw threaded fastening means or the like 42. The purpose and operation of the key 39 will be presently described.

An elongated handle member 43 is secured to the jaw 11 by screw threaded fastening means or the like 44 and it is to be noted that the handle member 43 projects outwardly at substantially right angles to the plane of the jaw face 15 of the jaw 11. A similar elongated handle member 45 is secured to the jaw 12 by screw threaded fastening means or the like 46 and the handle member 45 projects outwardly at substantially right angles to the plane of the jaw face 16 of the jaw 12.

In operation, the jaws 11 and 12 are moved to the open position as shown in full lines in Fig. 1 and in this position the tool is applied to a pipe 47 which is inserted between the springs 17 and 26 and into the recess 14. The jaws 11 and 12 are prevented from opening beyond the full line position as shown in Fig. 1, by engagement of the portion 12' on the jaw 12 with the surface 11' on the jaw 11. In passing into the recess 14, the pipe 47 engages the camming surfaces 22 and 31 on the springs 17 and 26 respectively to move such springs outwardly toward the jaw faces 15 and 16 respectively, thereby permitting movement of the pipe 47 inwardly of the recess 14 and thereafter, the springs 17 and 26 will resume their original position and prevent inadvertent removal of the tool from the pipe 47. Thereafter, the handle members 43 and 45 are grasped in the hands of the users and the jaws 11 and 12 moved toward each other to engage the jaw faces 15 and 16 with the pipe 47. At the same time, one of the keys 35 or 39 depending upon the diameter of the pipe 47 will engage such pipe and the toothed end of the key engaging the pipe will bite into the same to prevent relative movement between the pipe and the tool. As will be seen from an inspection of Figs. 1 and 2, the keys 35 and 39 are spaced longitudinally and transversely of the jaws 11 and 12 and consequently, different diameters of pipe may be accommodated with one or the other of the keys engaging such pipe to prevent relative movement between the same and the tool.

It will, therefore, be seen that the tool of this invention provides a means for conveniently engaging a pipe to permit lifting and transportation of the same and at the same time, includes means for preventing inadvertent removal of the tool from the pipe and also means to prevent relative movement between the pipe and the tool. Upon transportation of the pipe to the desired location, the tool may be conveniently removed therefrom by moving the jaws 11 and 12 apart and moving the tool transversely of the pipe to remove the same from the recess 14.

Where lengths of pipe are stacked in piles or supported on racks, difficulty may be experienced in engaging the jaws of the above described tool with the pipe due to the adjacent pipes or other obstructions and consequently, means has been provided on the tool of this invention to conveniently engage the pipe for facilitating movement of the same axially to a position where the jaws of the tool may be engaged with the pipe.

It will be noted that the handle member 45 is provided with a tapered enlargement 48 adjacent the pipe engaging head 10 and in the surface of this tapered enlargement 48 at one side thereof, there is secured a block 49 on the outer side of which is formed a segment of a standard pipe thread 50. As is well known, a pipe thread is tapered and in utilizing the tool of this invention to move a length of pipe axially it is only necessary to insert the handle member 45 into the end of a pipe until the outer end of the pipe thread 50 is within the end of the pipe, whereupon rotation of the tool relative to the pipe will, due to the taper of the thread 50 and the tapered enlargement 48, tightly wedge the tool in the end of the pipe whereupon a pull may be exerted on the tool to move the pipe laterally. After movement of the pipe to a position where the same may be engaged by the jaws of the tool, the tool may be removed from the pipe by rotation in a reverse direction which free the threads 50 from engagement with the inner surface of the pipe.

The versatility of the above described tool will be apparent since obviously, a tool has been provided which not only may be conveniently engaged with a length of pipe to facilitate lifting and transportation of the same, but may also be engaged with a length of pipe surrounded by closely adjacent objects in order to facilitate axial movement of the pipe into position for convenient engagement by the jaws of the tool of this invention.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A pipe handling tool comprising a pipe engaging head, said head including hingedly connecting jaws providing opposed pipe engaging faces, said jaws being movable from an open pipe receiving position to a pipe engaging position, means to limit opening of said jaws, a leaf spring on each jaw, each spring being secured at one end to a jaw adjacent said hinge connection, each spring extending outwardly along the adjacent jaw face in spaced relation thereto, a return bend at the opposite end of each spring providing a pipe engaging camming surface, each spring terminating at said opposite end in an angularly disposed portion having a slot therein, means extending through each slot into the adjacent jaw to limit movement of said springs away from said jaw faces, said springs providing detent means for engaging a pipe in the open position of said jaws to prevent inadvertent removal of said tool from said pipe, a removable pipe engaging toothed key secured in each jaw and projecting inwardly of each jaw face, said keys being spaced longitudinally and transversely of said jaws to engage different sizes of pipe and prevent movement of the pipe relative to said tool and an elongated handle secured to each jaw and extending a substantially right angles to the plane of each jaw face.

2. A pipe handling tool comprising a pipe engaging head, said head including hingedly connecting jaws providing opposed pipe engaging faces, said jaws being movable from an open pipe receiving position to a pipe engaging position, means to limit opening of said jaws, an elongated spring on each jaw, each spring being secured at one end to a jaw adjacent said hinge connection, each spring extending outwardly along the adjacent jaw face in spaced relation thereto, a return bend at the opposite end of each spring providing a pipe engaging camming surface, each spring terminating at said opposite end in an angularly disposed portion having a slot therein, means extending through each slot into the adjacent jaw to limit movement of said springs away from said jaw faces, said springs providing detent means for engaging a pipe in the open position of said jaws to prevent inadvertent removal of said tool from said pipe, a pipe engaging toothed key on each jaw projecting inwardly of each jaw face, said keys being spaced longitudinally and transversely of said jaws to engage different sizes of pipe and prevent movement of the pipe relative to said tool and an elongated handle secured to each jaw and extending at substantially right angles to the plane of each jaw face.

3. A pipe handling tool comprising a pipe engaging head, said head including hingedly connecting jaws providing opposed pipe engaging faces, said jaws being movable from an open pipe receiving position to a pipe engaging position, means to limit opening of said jaws, an elongated spring on each jaw, each spring being secured at one end to a jaw adjacent said hinge connection, each spring extending outwardly along the adjacent jaw face in spaced relation thereto, a return bend at the opposite end of each spring providing a pipe engaging camming surface, each spring terminating at said opposite end in an angularly disposed portion having a slot therein, means extending through each slot into the adjacent jaw to limit movement of said springs away from said jaw faces, said springs providing detent means for engaging a pipe in the open position of said jaws to prevent inadvertent removal of said tool from said pipe, means on each jaw projecting inwardly of each jaw face to engage the pipe and prevent movement of the pipe relative to said tool and an elongated handle secured to each jaw and extending at substantailly right angles to the plane of each jaw face.

4. A pipe handling tool comprising a pipe engaging head, said head including hingedly connecting jaws providing opposed pipe engaging faces, said jaws being movable from an open pipe receiving position to a pipe engaging position, means to limit opening of said jaws, an elongated spring on each jaw, each spring being secured at one end to a jaw adjacent said hinge connection, each spring extending outwardly along the adjacent jaw face in spaced relation thereto, a return bend at the opposite end of each spring providing a pipe engaging camming surface, each spring terminating at said opposite end in an angularly disposed portion having a slot therein, means extending through each slot into the adjacent jaw to limit movement of said springs away from said jaw faces, said springs providing detent means for engaging a pipe in the open position of said jaws to prevent inadvertent removal of said tool from said pipe and an elongated handle secured to each jaw and extending at substantially right angles to the plane of each jaw face.

5. A pipe handling tool comprising a pipe engaging head, said head including hingedly connected jaws providing opposed pipe engaging faces, said jaws being movable from an open pipe receiving position to a pipe engaging position, means to limit opening of said jaws, yieldable detent means on each jaw for engaging a pipe in the open position of said jaws to prevent inadvertent removal of said tool from said pipe, means on each jaw projecting inwardly of each jaw face to engage the pipe and prevent movement of the pipe relative to said tool and an elongated handle secured to each jaw and extending at substantially right angles to the plane of each jaw face.

6. A pipe handling tool comprising a pipe engaging head, said head including hingedly connected jaws providing opposed pipe engaging faces, said jaws being movable from an open pipe receiving position to a pipe engaging position, means to limit opening of said jaws, yieldable detent means on each jaw for engaging a pipe in the open position of said jaws to prevent inadvertent removal of said tool from said pipe and an elongated handle secured to each and extending at substantially right angles to the plane of each jaw face.

References Cited in the file of this patent

UNITED STATES PATENTS

| | | |
|---|---|---|
| 1,094,113 | Bissen | Apr. 21, 1914 |
| 1,364,589 | Schultz | Jan. 4, 1921 |
| 1,469,911 | Aumiller | Oct. 9, 1923 |
| 1,625,255 | Hudgins | Apr. 9, 1927 |
| 2,374,406 | Bezzerides | Apr. 24, 1945 |